No. 706,746. Patented Aug. 12, 1902.
R. A. FESSENDEN.
SIGNALING BY ELECTROMAGNETIC WAVES.
(Application filed July 1, 1902.)
(No Model.)

WITNESSES:
Herbert Bradley
F. E. Gaither

INVENTOR
Reginald A. Fessenden
by Dennis B. Wolcott
Att'y.

UNITED STATES PATENT OFFICE.

REGINALD A. FESSENDEN, OF MANTEO, NORTH CAROLINA

SIGNALING BY ELECTROMAGNETIC WAVES.

SPECIFICATION forming part of Letters Patent No. 706,746, dated August 12, 1902.

Application filed July 1, 1902. Serial No. 113,970. (No model.)

*To all whom it may concern:*

Be it known that I, REGINALD A. FESSENDEN, a citizen of the United States, residing at Manteo, in the county of Dare and State of North Carolina, have invented or discovered certain new and useful Improvements in Signaling by Electromagnetic Waves, of which improvements the following is a specification.

My invention relates to the transmission of power and signals by electromagnetic waves of a kind which have been discovered and investigated by me, and is particularly concerned with means for the efficient sending and receiving of such waves and for the exact maintenance of tuning. These waves differ from those described by Hertz in that they are not complete waves, but only half-waves, and in that they travel over the surface of a conductor, and hence, unlike Hertz waves, can be deflected from a straight line. They have the property in common with Hertz waves in that the energy received by a given area varies inversely as a given distance. They differ from the waves investigated by Lodge in that they are not current waves, but semifree ether waves. Thus in the Lodge waves the electric energy is maximum when the magnetic energy is minimum and all energy not absorbed by resistance losses is recoverable, while with the form investigated by me the electric energy is a maximum at the same time as the magnetic and none of the energy radiated is recoverable except by reflection. I have found that it is essential for the proper sending and receipt of these waves that the surface over which they are to travel should be highly conducting, more especially in the neighborhood of the point where the waves are generated. I have found that this highly-conducting portion of the surface should preferably extend to at least a distance from the origin equal to a quarter wave length of the wave in air and in the direction toward the station or stations to which it is desired to send the waves. Where the sending-station is in a city or similar place where the waves may be cut off by high buildings or high trees, this highly-conducting path should be extended still farther until it passes beyond the limits of the obstacle, and there the highly-conducting portion, which may be in the form of a strip of metal or other conductor or of a number of wires, is connected to ground. This arrangement may be called a "wave-chute."

Figure 1:
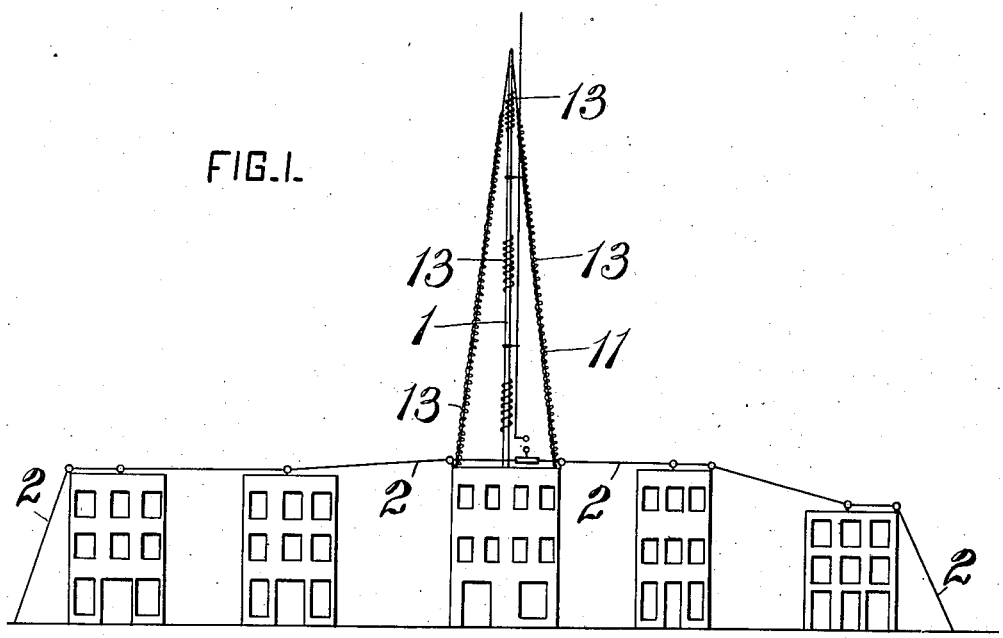
Figure 2:
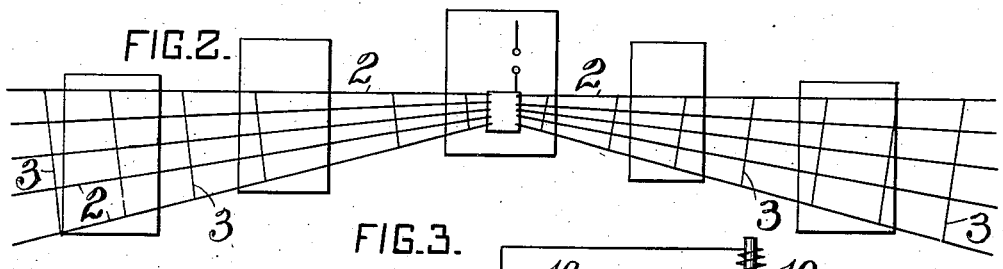

In the accompanying drawings, forming a part of this specification, Figure 1 shows the artificial ground or wave-chute arranged for a station located in a city. Fig. 2 is a plan view of the arrangement shown in Fig. 1, and Fig. 3 illustrates the ground or chute in connection with a low conductor, and Fig. 4 is a plan view showing arrangement of station on rocky shore or other non-conducting ground.

In the practice of my invention I connect the grounded end of the sending or receiving conductor 1 directly or by means of a conductor to a number of wires or strips 2, radiating out, as shown, preferably to a distance of a quarter wave length or beyond or to points beyond the high buildings or other obstacle, as if the wires do not extend for a quarter wave length there is not sufficient capacity between the sending-conductor and the artificial ground. These wires are grounded, preferably, at their ends and are laterally connected by other wires or strips 3, as shown. This arrangement is equivalent for electromagnetic waves of such frequencies as are commonly used to a conductor formed of a solid strip of metal. When it is desired to send one particular direction or directions, these wires or strips are arranged so as to lie only in the direction in which it is desired to send. Fig. 1 shows such an arrangement for sending from a station in a city having tall buildings containing pipes or conductors of metal.

Figure 3:
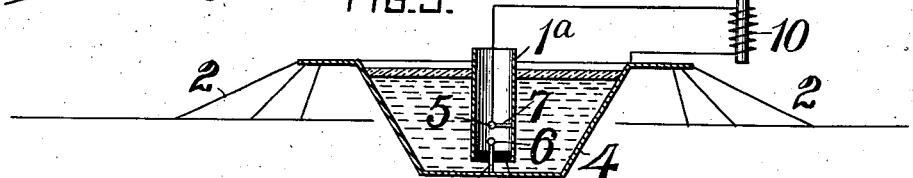
Figure 4:
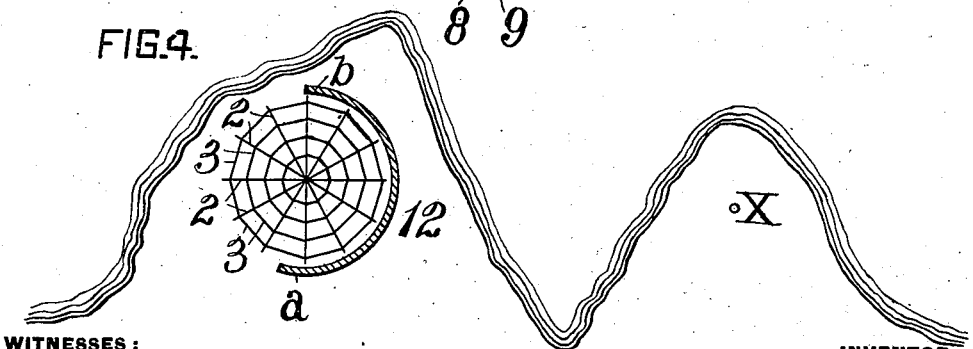

In using a low conductor in connection with an artificial ground or wave-chute it is preferred to employ the embodiment shown in Fig. 3 of the conductor described and claimed in application Serial No. 62,303. This construction consists of a tubular conductor 1ª, immersed in a medium having an electrical constant on which the wave length depends of a value greater than that of air—as, for example, water, which is contained in a vessel 4, formed of conducting material, as metal. To prevent evaporation of the water, the vessel is covered with glass or other insulating material, or oil may be placed on the surface of the water for the same purpose. It is preferred to arrange the sparking terminals 5 and 6 within the tubular conductor 1ª, one of the terminals, as 5, being electrically connected by an arm 7 to the conductor 1ª, while the terminal 6 is electrically connected by the post 8 to the containing vessel 4. The lower end of the tubular conductor is closed by a plug 9, of insulating material, through which passes the post 8. By securing the plug to the conductor and to the post 8 the latter will serve as a support for the conductor. As shown, one of the sparking terminals, as 5, is connected to the secondary coil of a suitable generator, as the induction-coil 10, and the other terminal, as 6, is also connected to such secondary coil through the post 8 and the wall of the containing vessel 4. The containing vessel is connected to ground by the artificial ground or chute extending in the direction it is desired to signal.

Another very important function of the construction here described is that it enables the capacity and self-induction of the sending-station to be maintained constant, which is of fundamental importance in working tuned circuits. It frequently happens that stations are situated on rocky portions of coast where salt spray sometimes dashes up and renders portions of the ground-surface near the station conducting which were previously insulating, hence changing the capacity and inductance of the sending-conductor. If, however, the surface be covered by the network or strips heretofore described, the capacity will not be changeable, but constant, as the surface near the station is maintained in a constantly-conducting state. Hence the stations once tuned will not be put out of tune by changes of weather or other disturbances. In order, however, that this second function of my construction may be fully taken advantage of, it is preferable to use metallic ropes or chains 11 for supporting the masts where masts are used, as where ropes are used they are apt to become saturated with salt water in stormy weather and to become conductors capable of absorbing the electromagnetic waves, thereby cutting off a portion at least of the electromagnetic waves from the receiving-conductor. These wire guys would in general absorb the waves rapidly, since for cheapness they would be made of iron or steel, and since the currents generated in iron or steel conductors at such frequencies as would be used in practice are confined to a very thin film or the outside of the wires they would oppose large resistance to such currents. I therefore for the full practice of my invention to prevent such absorption cover such wires, wire ropes, or chains with a coating of a non-magnetic conductor, preferably zinc or lead, and thus render the ohmic resistance of the wires, wire ropes, or chains to the currents produced by electromagnetic waves of the frequencies used so low that there is little absorption. I also prefer to insulate them from ground, so that they have a natural period as far removed as possible from that of the electromagnetic waves used for signaling. When a metallic mast is used, it also should have its outer surface formed of non-magnetic good conducting material.

An additional advantage consequent on the employment of an artificial ground or wave-chute is the possibility of guarding against outside interference by insulating or cutting out the artificial ground in the direction of the distributing-station—as, for example, in the arrangement shown in Fig. 4, where the artificial ground or wave-chute is shown extending entirely around the conductor or station. The portion of network or wires 2 between the points $a$ and $b$ toward the distributing-station X are insulated from the ground, and a conducting-path 12 is formed around the artificial ground, extending between the points $a$ and $b$, so that electrical disturbances from the station X will be led around the conductor or station.

In order to render it certain that the natural period of the mast and guys is different from that of the electromagnetic waves, said mast and guys may be wrapped or encircled with one or more coils or turns 13 of iron strips or wire, preferably insulated, thus increasing the inductance and natural period of the mast and guys and permitting the employment of conducting material—e. g., iron or steel—in the masts and guys. As shown in Fig. 1, the coils or turns may be either formed locally—i. e., extending a short distance along the mast or guys—and such coils or turns may extend continuously along such parts.

While the coating of the mast and guys with non-magnetic material need not necessarily be used with the coils or turns, it is preferred in most cases to both coat the masts and guys with non-magnetic material and to also employ the coils or turns of magnetic wire or strips, which may be formed of nickel or other magnetic material. No. 40 Brown & Sharpe gage of wire is a size suitable for the purpose.

I claim herein as my invention—

1. In a system for the transmission of energy by electromagnetic waves, a sending-conductor for radiating such waves and an artificial ground connected to the lower end of the sending-conductor and to ground and extending outwardly from the sending-conductor, substantially as set forth.

2. In a system for the transmission of energy by electromagnetic waves, a sending-conductor for radiating such waves and an artificial ground connected to the lower end of the sending-conductor and to ground and extending outwardly from the sending-conductor a distance equal to a quarter wave length in air of the electromagnetic-wave length used, substantially as set forth.

3. In a system for the transmission of energy by electromagnetic waves, a sending-conductor for radiating such waves and an artificial ground consisting of a series of wires or strips connected to the lower end of the sending-conductor and to ground and radiating from the lower end of the conductor and connected at suitable intervals by transverse wires or strips, substantially as set forth.

4. In a system for the transmission of energy by electromagnetic waves, a sending-conductor for radiating such waves and an artificial ground connected to the lower end of the sending-conductor and to ground and extending outwardly from the sending-conductor a distance equal to a quarter wave length in air of the electromagnetic-wave length used and in the direction in which it is desired to send the waves, substantially as set forth.

5. In a system for the transmission of energy by electromagnetic waves, a sending-conductor for radiating such waves and an artificial ground connected to the lower end of the sending-conductor and connected at its outer end to ground, substantially as set forth.

6. In a system for the transmission of energy by electromagnetic waves, a sending-conductor for radiating such waves supported by a metallic conductor of low resistance to currents of the frequencies used, substantially as set forth.

7. In a system for the transmission of energy by electromagnetic waves, a sending-conductor for radiating such waves supported by a metallic conductor, a shield for said conductor having low resistance to currents of the frequencies used, substantially as set forth.

8. In a system for the transmission of energy by electromagnetic waves, a sending-conductor for radiating such waves supported by a metallic conductor having a natural period of oscillation different from that of the frequencies of the electromagnetic waves used, substantially as set forth.

9. A conductor for radiating electromagnetic waves, consisting of a conductor immersed in a liquid medium having an electric constant on which the wave length depends of a value greater than that of air, substantially as set forth.

10. A conductor for radiating electromagnetic waves, consisting of a conductor immersed in water, substantially as set forth.

11. A conductor for radiating electromagnetic waves, consisting of a metal vessel containing a medium of the character described, a conductor immersed in said medium and a generator, substantially as set forth.

12. A conductor for radiating electromagnetic waves, consisting of a metal vessel containing a medium of the character described, a tubular conductor immersed in the medium, sparking terminals arranged in the chamber, substantially as set forth.

13. In a system for the transmission of energy by electromagnetic waves, a sending-conductor for radiating such waves, an artificial ground connected to the lower end of the sending-conductor and to ground and extending outwardly from the sending-conductor, and a second grounded conducting-strip leading around the station from that facing a source of electrical disturbances to the opposite side, substantially as set forth.

14. In a system for transmission of energy by electromagnetic waves, a support for a conductor encircled by one or more turns or coils of magnetic material, substantially as set forth.

15. In a system for transmission of energy by electromagnetic waves, a support for a conductor encircled by one or more turns or coils by iron wire, substantially as set forth.

16. In a system for transmission of energy by electromagnetic waves, a conductor in combination with a support therefor, said support having a coating of non-magnetic material, substantially as set forth.

17. In a system for transmission of energy by electromagnetic waves, a conductor in combination with a support therefor, said support having a coating of non-magnetic material and encircled by one or more turns of magnetic material, substantially as set forth.

In testimony whereof I have hereunto set my hand.

REGINALD A. FESSENDEN.

Witnesses:
DARWIN S. WOLCOTT,
JOHN L. FLETCHER.